July 26, 1927.

N. C. JOHNSON 1,637,321

METHOD OF AND COMPOSITION FOR TREATING CONCRETE

Filed June 17, 1925

Inventor
Nathan C. Johnson
By his Attorneys
Ward Crosby & Smith

Patented July 26, 1927.

1,637,321

UNITED STATES PATENT OFFICE.

NATHAN C. JOHNSON, OF ENGLEWOOD, NEW JERSEY.

METHOD OF AND COMPOSITION FOR TREATING CONCRETE.

Application filed June 17, 1925. Serial No. 37,625.

My invention relates to method of and compositions for treating concrete.

According to the ordinary method of making concrete bodies, walls, etc., suitable mold forms are made and a suitable concrete mass composed of a mixture of water, cement, sand and larger aggregate particles, is poured into the forms and permitted to set. The forms are usually made of wood; and when removed, there almost invariably appears on the surface of the concrete, irregularities in the surface demarking the outlines of the mold boards and often the grain of wood, etc., all of which gives to the surface a very unsightly appearance. The imperfections in the inner surface of the mold frame are very faithfully reproduced on the surface of the concrete structure due to the fact that the surface of the latter is composed almost entirely of the finer ingredients of the mass.

The use of concrete has been greatly restricted by reason of such unsightly form marks which in the past could only be removed by expensive or undesirable methods and also by reason of the peculiar color and texture of the concrete which reflects light rays of an unpleasing color to the eyes and also because such surfaces refuse to bond with materials later applied, as, for instance, plaster or other cement. The result has been that where the expense has been warranted, other materials have been used, which, because of the natural colors and shapes and surface textures thereof, are capable of producing a much more sightly and pleasing appearance in building construction and of bonding with cement and other plastic materials. Further, to produce a concrete element with the minimum amount of unsightliness, the forms have been very carefully made of planed lumber, rigidly true to line and with closely abutting edges and ends and with lumber well seasoned, in order that the boards in the forms may not shrink before the concrete is poured, leaving cracks through which the fluid concrete will extrude when the form is filled, forming unsightly ridges or "fins". Since in any case the cost of the material for the forms and their erection is a substantial item in such concrete construction,—about 38% of the total cost,—these especial precautions add very greatly thereto and even then the result is not satisfactory, from the standpoint of appearance.

Strong mineral acids such as hydrochloric acid, have long been used for scrubbing down set or hardened concrete surfaces in an attempt to remove the undesirable surface and expose the aggregate by eating away the cement surface by such acid, but this is costly, tedious and impractical. It has also been proposed to mix a strong mineral acid such as hydrochloric acid, with clay or loam, and with a small percentage of soap, to form a thick pasty mass to be applied to set plasters which may embody cement and granulated materials or aggregate, the acid being assumed to act to corrode or eat away the binding cement or other medium as above described, this paste being applied to the cement after it has set, i. e., in about eight or ten hours. Due to many features of such treatment among which I might point out that such acids are very volatile and if allowed to stand exposed for any time lose their effective corroding value, this proposed process has proven ineffective. Further, such a paste after being applied does not feed the acid to the cement but retains it within itself by surface tension. Furthermore, clay is an aluminum trioxide, and if clay is used with the hydrochloric acid, a certain amount of aluminum is converted into alumina chloride which tends to accelerate the hardening of concrete, thus defeating the object in view—i. e., the destruction of the surface layer of cement except to a superficial and inutile degree. Again, such an acid and clay paste would tend to hurt the forms if it was attempted to use such a mixture on forms, and particularly if metal forms were used. Nor would such a paste be effective if applied to forms before pouring concrete.

With the present invention, a rough textured concrete surface with the aggregate exposed to any desired extent may be provided in a reliable, cheap and easy manner without affecting or endangering the strength of the concrete body. This is very desirable for many purposes, such for example as to give a pleasing rough finish—pebble- or rock-like surface—to concrete, or to permit a better bonding of plaster or cement to a concrete surface; or to bond together in a manner heretofore impossible two portions of a concrete structure, such as a wall, that are poured at different times, since with this surfacing treatment, the second pouring will unite and bond itself perfectly to the rough and clean surface of the first portion to set. A further object is the elimination of the outer surface which is over-rich in cement, so as to do away with the harmful cracks which always occur in this rich cement surface, due to the fact that it has a different coefficient of expansion from the body of the concrete. Most disintegrations of concrete start in this outer surface, probably during the early or formative stages; and so powerful is the tension in this rich skin that it ruptures the body of the concrete, thus inviting further deteriorations. With the use of my invention, these detriments and dangers are prevented, thus assisting towards permanence and durability.

According to the present preferred embodiments of the invention, I provide a suitable colloidal composition containing a suitable "medication" substance or substances which will render unsound the surface layer of the cement thus preventing or very greatly delaying the setting of the surface layer of concrete.

According to the preferred form of the invention, the colloidal composition is applied to the forms as a varnish coat that quickly dries; and is insoluble in ordinary waters but is soluble or distensible in the alkaline waters of the wet concrete, and it is allowed to dry or partly dry before coming into contact with the concrete. There are various suitable colloidal vehicles and many suitable medication substances, and I will discuss them hereafter.

The action of my composition upon the concrete according to the preferred form of the invention, is as follows: When concrete is poured into the coated forms, the reagent leaves the colloidal vehicle of the composition by dialysis and under control; and is slowly diffused in the concrete, thus affecting the cement therein adjacent the colloidal composition coating to any desired or predetermined depth, so as to change the composition of this cement by unbalancing the same, thereby rendering it unsound and unsetting, just as though the predetermined portion of the cement adjacent the surface with which the reagent came in contact, had been made of improper and non-setting composition at the mill, but without the reagent affecting the cement lying beyond the predetermined desired depth that was intended to be affected by the reagent.

The colloidal composition is preferably applied to the inner surface of forms into which the concrete is to be poured, so as to have it act on the concrete before it takes its initial set, or I may otherwise apply it to a concrete surface before or shortly after it takes its initial set. Even when the composition is applied directly upon the concrete, to get the best results, the medicated composition should be applied within one or two hours after the placing of the concrete in situ where it is to set; but results will be obtained if the composition is not so promptly applied; that is to say, it may be applied within such period of time as the products of hydration of the cement may be in a sufficient fluid or formative stage to be rendered unsound by the reagent. The exact period of time at which his reaction may take place between the medication reagent and the cement constituents cannot be exactly stated as a fixed or general rule for all cases, since the rapidity of the process of hydration in cement depends upon several factors, including the particular cement used, the quantity of water present, the temperature of the cement, etc.

The invention comprises the method of applying the composition and of controlling the action of the medication on the concrete; and the medicated composition.

In the drawings, Fig. 1 is a side view of a block of ordinary concrete;

Figure 1:
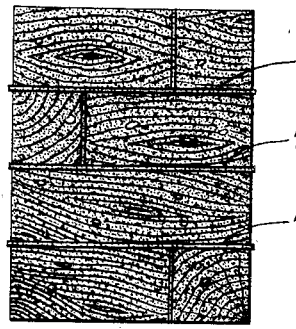

According to the preferred manner of practicing the invention, I treat the concrete by applying said composition (in a manner depending upon the particular use) to the concrete surface over the desired area thereof before it takes its initial set, the "medication" acting to "poison" or "medicate" the cement and inhibit the setting of and/or render unsound a relatively thin layer of the cement in the concrete at said surface, whereby, after the interior or body portion of the concrete has set, the said layer of cement, the setting of which has been inhibited by rendering unsound the cement therein, may be easily removed for a predetermined depth which usually is less than half the average diameter of the aggregate particles, so as to expose the aggregate over said area, but without affecting the interior body portion of the concrete mass. The "poison" or medication is incorporated in the vehicle—a colloid—and the colloid is so chosen as to give off the "poison" slowly but with sufficient rapidity to inhibit the setting and change the nature of the cement to the desired depth. The colloidal vehicle or body portion is also so chosen as to enable an easy, reliable and even application of the "poison" or medication to the forms so as to adhere thereto under considerable abuse and to insure a uniform effect.

I prefer to use a colloidal composition containing a medicating reagent or reagents capable of affecting the cement to the desired extent, with these reagents incorporated in the colloidal vehicle in such manner as to form a composition of such consistency, viscosity and properties that it may be easily applied to and retained by the various form surfaces. Preferably the composition used is of the consistency of a good grade of shellac or copal dissolved in alcohol. While various emulsions or water-distensible colloids may be used, it is quite important in commercial work that the vehicle or the composition carrying the medication substance or reagents should be insoluble and/or not distensible except in alkaline waters, such as are produced in the concrete and pervade the concrete due to reaction between the water and Portland cement.

Examples of such water insoluble bodies or vehicles are, casein, either with or without formaldehyde, or gums, such for example as shellac or manila gum or rosin, dissolved in alkali or in alcohol, or drying oils and the like. The word "gum" in reference to the vehicle is here used in its broader aspect or meaning, i. e. as including substances more narrowly termed gums as well as those more narrowly termed resins. I prefer as a body or carrier for the reagents, gum shellac dissolved in alcohol, to which the reagent or reagents may be added. A suitable starch paste such as one made of cornstarch properly treated to form a viscous distensible colloid of low solubility, may be used. While I have given these as examples of satisfactory colloidal vehicles, I do not wish to be understood as in any way being limited to only these particular examples.

As is well known, Portland cement is a tribasic compound consisting of oxy-compounds of lime, alumina and silica; and on a chemical coordinate basis its composition is represented by a known and definite point. The action of at least one of the medication substances should be such as to so disturb the proper composition of that cement in the portion of the concrete it is desired to removed as to prevent its cohering, in contrast to the forming of proper chemical combinations in setting, as in undisturbed Portland cement; that is, by means of proper medication at a proper time it is possible to alter the position of this "true Portland point" on a coordinate diagram for a definite and desired portion of the concrete contiguous to the surface or elsewhere and to any degree and in any manner desired or desirable.

For instance, sugars alter the solubility of lime, thereby upsetting one side of the tribasic compound. This alters the Portland point on one side of the tribasic diagram and failure to set results. Also, certain metallic salts upset the alumina and silica sides of the equation thereby affecting other sides of the diagram with like results. According to my process, by a proper medication the total inability to set and harden in the normal manner is induced in the desired surface portion of the concrete by affecting the cement contained in that portion, either on one side of the composition alone, or on more than one side, as may be desired.

Many different and widely varying substances may be used as the reagents or medication. For example, they may consist either of mixtures of sugar products, of metallic salts, or of glucocides, or glucose, or dextrines, either with or without metallic salts, or metallic salts either with or without other substances. An example of metallic salts which may be used are, magnesium sulphate, magnesium carbonate, magnesium chloride, magnesium saccharate, aluminum chloride, calcium sulphate, zinc sulphate, various metallic phosphates, acetates, etc., and also together with certain caustic alkalis such as sodium or potassium hydroxide or both, which latter may also serve to enable aqueous solutions of the metallic salts and of the glucocides or the like to be incorporated with the colloidal body, such as shellac in alcohol, without precipitating the gum in the alcohol, inasmuch as these gums are soluble in the caustic named, and inasmuch as these caustics are also soluble in alcohol. The addition of such a mixture to shellac varnish is, therefore, accomplished by reason of this interchange of solution and without separation.

The following groups, for example, may be used as inhibiting or medicating agents:

(a) Cellulose group, including both the starches and the gums. Among the latter are all the water soluble gums such for example as gum arabic, gum gamboge, etc.

(b) The diatomic phenols, such as pyrocatechin, resorcin, hydroquinone, and the higher phenols, such as pyrogallic acid.

(c) Polyatomic monobasic phenolic acids such as gallic acid and gallitinic acid, and phosphates above mentioned.

(d) Glucocides. In this group is found the extracts used for tanning, obtained from various vegetable materials such as cutch and quebracho.

(e) Carbohydrate group. Sugars, starches, inverse, pectins, etc.

(f) C. H. N. group. Cyanides, cyanates, cyanamids, etc., which will unite with or replace lime or alumina or both.

(g) Magnesium-zinc silico fluoride or silico-fluorides or equivalent salts. These render calcium insoluble and therefore prevent setting; also zinc replaces both calcium and aluminum, thus further upsetting the proper (or setting) composition of cement.

There are hundreds of substances which may be used as the reagent or medication with more or less satisfactory results, and I will not attempt to set forth all of the various colloidal compositions containing suitable medications that may be used, but will confine myself to giving one or two examples of colloidal compositions which I have used with very satisfactory results.

*Example 1.*—Ten grains of tannic acid are added to one gallon of water and to this is added 100 grams of cornstarch and the whole boiled until the starch grains have exploded to form a viscous colloidal paste which may be conveniently applied with a brush or otherwise as desired. Sugar may be substituted for or added with the acid and also a hygroscopic salt such as calcium chloride may be included, the amount of water being suitably varied if necessary to accommodate the same. The tannic acid appears to have the effect of delaying the setting and may inhibit it, but will not upset the equation, as above pointed out. But the sugar will upset one side of the equation and has the effect of destroying the cement.

*Example 2.*—A mixture of orange shellac gum and manila gum dissolved in suitable quantities of alcohol and with or without waxes to the desired consistency to form the colloidal vehicle or body. For this purpose, about 2 pounds of the shellac and about two and a quarter pounds of the manila gum may be dissolved in about three and a half quarts of wood alcohol. The reagents or medication substances used in this vehicle are aluminum chloride, magnesium saccharate and magnesium chloride in suitable proportions, depending upon the particular use; such for example as aluminum chloride one-fourth ounce, magnesium saccharate six ounces, magnesium chloride two ounces, and these metallic salts are mixed in with a small quantity of water, say a half pint. A composition made according to this formula and with these amounts, will produce about a gallon of the colloidal substance which will be sufficient to treat about 250 square feet of concrete surface to a depth of approximately three-eighths of an inch, the quantity of cement affected by this quantity of the composition being about 9 cubic feet of concrete or about 150 pounds of Portland cement. Greater quantities of the reagents or "medication" per gallon affect greater depths from the surface by reacting with greater quantities of cement.

The medicated colloidal composition may, as stated, be placed upon the forms or directly upon the concrete, or if desired it may be placed upon paper or the like linings of forms, and it may be so used on forms or linings or directly upon the concrete itself as to produce figured or pattern effects, as well as to remove the entire surface layer. In the case of applying the colloidal composition to forms, the composition is spread over the side of the forms and those parts of the forms where it is desired to inhibit setting for a slight depth, and the concrete is then poured into the forms.

The concrete may be poured immediately after the application of the coating to the forms and while the colloidal composition coating is still wet, but the action is imperfect as compared to the action when the composition has dried. It is desirable that the coating be sufficiently dry to enable the medication to be given off from the composition by dialysis through the artificial membrane formed of the dried coating; and it is preferred that the coating shall be substantially dry on the forms, for when the coating has been allowed to dry out before the concrete is poured, the form coating will not be injured during placement, and the alkaline waters of the concrete will effectively act on the composition to soften the same so as to enable the reagent or medication to be given off by dialysis and enter the surface layer of the concrete for the purpose desired and under strict control.

I use the composition preferably in the form of a somewhat viscous mixture of the consistency of a good grade of 4 pounds per gallon of gum shellac or gum copal or manila gum in alcohol and it dries out quickly and adheres well to the vertical surfaces of the forms. I find that wherever my set-inhibiting composition is employed on the forms it is unnecessary to coat the forms with any other material, such as is usual, to prevent the concrete from sticking to the forms. The coating is easily brushed on the surface of the forms which is to come next to the concrete.

After this material has been applied to the inside of the forms where desired and preferably allowed to dry, the concrete mixture is poured into the forms in the usual or any suitable manner. The mass of concrete then sets in the usual way except at the surface adjacent the set inhibiting material. Through the various actions before described, the reagent or reagents are slowly diffused in the concrete at the treated surfaces, thus preventing or delaying the setting of the cement over said surface for the desired and predetermined depth. When the interior body portion of the mass has acquired the usual or suitable set, the forms are removed and the unset cement at the treated surface with the diluting sand therein is easily removed by alternately hosing and brushing or by either alone; or it may be removed by the action of rain washing and weathering. It is advisable to promptly remove the treated surface, preferably within about 24 hours, since in some cases if the treated layer is left on long enough it will harden by carbonization due to contact with the air, and become difficult to remove. This produces a solid body of concrete with the aggregate particles or the larger particles of the aggregate projecting from the treated facial area to form relatively large exposed surfaces of such aggregate thereat, said exposed surfaces of the aggregate being substantially free of cement and having substantially their normal shape, color and appearance; that is, these aggregate surfaces have practically the same appearance and color they had before being added to the concrete agglomerate; and from them is reflected diffused light pleasing to the eye, with resultant hiding of irregularities of surface or other defects which, without the use of my invention, detract from the finished appearance and restrict the uses of concrete by depreciating its value.

Figure 2:
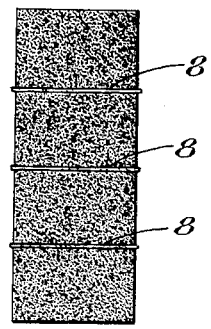
Fig. 2 is an edge view of the same.
Figure 3:
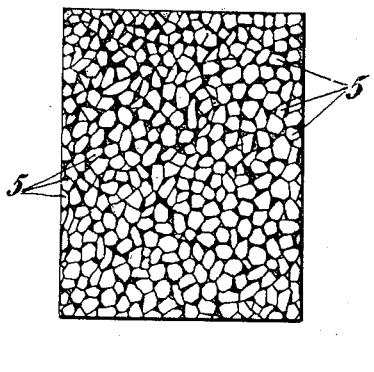
Fig. 3 is a view similar to Fig. 1 illustrating a block of concrete the front face of which has been developed according to my invention.
Figure 4:
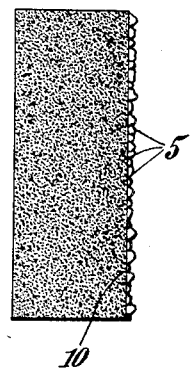
Fig. 4 is an edge view of the same.

I have endeavored to illustrate the foregoing result in the drawings wherein Fig. 1 shows the face of a concrete block which has not had improvements applied thereto, and Fig. 2 is an edge view of the same. It will be noted that the surfaces are composed almost entirely of the fine cement and sand particles, only points of the larger aggregate particles appearing here and there. This is due to the fact that the aggregate or larger particles only touch the surfaces of the forms at a relatively few widely separated points, permitting the finer particles of cement and sand to make up the surface therebetween, and on this surface plainly appear the lines demarking the outlines of the boards, etc., as indicated by the lines 7 and 8. When, however, a face or area has been treated according to my improvements as illustrated in Fig. 3, much larger percentages of the aggregate particles become visible giving the surface a much more pleasing appearance. Indeed I prefer to inhibit the setting and remove the cement and sand to such a depth that very little of the set cement will be visible. The depth of removal of the cement and sand is preferably considerably less than the average diameter of the coarse aggregate particles so that few of the aggregate particles will fall away in the removal process and practically all of the aggregate particles at the treated surface will have a part thereof embedded in and held rigidly by the untreated set cement. As shown in Figs. 3 and 4 a substantial portion of the surfaces of the aggregate 5 is exposed at the treated face beyond the general plane 6 of the set cement thereat.

It may be further mentioned that among the advantages of using shellac or manila gum or the like dissolved in alcohol as the colloidal vehicle, are (1) that a colloidal vehicle of this character prevents adulteration or dilution on the job by the addition of water or solutions of like nature which will not dissolve the colloid because the addition of water or the like will throw out the colloidal body and render the composition unusable; (2) if such a medicated colloidal composition, by accident or design, is put into the concrete mix or into water to go into the same, this same action occurs, i. e., throwing out of the colloidal body or coagulation of the same, without any damage to the body or structure of the concrete other than the mere mechanical adulteration of the mix by the agglutinated gum.

This application is in the nature of a continuation of my copending application Serial No. 690,215, filed February 2, 1924, for improvements in concrete and method of and substance for producing same.

While I have described my invention in considerable detail and with respect to the preferred method of utilizing the same and the preferred ingredients of the composition, it will be understood by those skilled in the art, after having understood my invention, that various changes and modifications may be made without departing from the spirit or scope of the invention, and I aim in the appended claims to cover all such embodiments and changes as come within the spirit of the invention.

What I claim as new and desire to secure by Letters Patent, is:

1. Process of treating concrete surfaces, which consists in applying to the concrete surface a layer of a colloidal composition containing a reagent material which will react upon the cement of the concrete to prevent or sufficiently retard the setting of such of the cement as it comes in contact with the colloid serving to provide a suitable coating or layer of the composition in contact with the concrete surface and to gradually feed the reagent from the composition to the cement.

2. Process of treating concrete for rendering unsound the surface layers thereof, which consists in applying to the concrete surface a layer or coating of a viscous colloidal composition containing a medication substance comprising a compound containing at least one basic element of Portland cement which will react upon the cement of the concrete to unbalance the composition of the same so as to render non-setting or unsound the surface of the cement with which said medication substance comes in contact, the colloid serving to provide a suitable coating or layer of the composition in contact with the concrete surface and to gradually feed the medication substance from the composition to the cement.

3. Process of treating concrete surfaces according to claim 1, characterized by the fact that the colloidal composition containing the reagent material is applied to the concrete within about five hours after the concrete is placed for setting.

4. Process of treating concrete surfaces according to claim 1, characterized thereby that the colloidal composition containing the reagent material is applied to the surface of the form into which the concrete is poured.

5. Process of treating concrete surfaces, which consists in applying to the concrete surface a layer of a colloidal composition containing a reagent material which will react upon the cement of the concrete to prevent or sufficiently retard the setting of such of the cement as it comes in contact with, and allowing the composition to dry before it comes in contact with the concrete sufficiently to cause the reagent material to be fed from the composition to the concrete by dialysis.

6. Process of treating concrete surfaces, which consists in applying to the concrete surface a layer of a colloidal composition containing a reagent material which will react upon the cement of the concrete to prevent or sufficiently retard the setting of such of the cement as it comes in contact with, the surface of the composition before it comes in contact with the concrete being allowed to dry out substantially and sufficiently to toughen the layer.

7. Process of treating concrete surfaces according to claim 1 characterized thereby that the colloidal composition containing the reagent material is applied to the surface of the forms into which the concrete is poured, said composition being allowed to become substantially dry on the forms before the concrete is poured.

8. Process of treating concrete surfaces, which consists in applying to the concrete surface a layer of a colloidal composition containing a reagent material which will react upon the cement of the concrete to prevent or sufficiently retard the setting of such of the cement as it comes in contact with, and removing the treated surface layer before carbonation has set in to harden the same.

9. A composition for treating concrete surfaces to eliminate the surface layer of the concrete, which comprises a reagent material which will prevent the setting of the cement of the concrete with which it comes into contact or substantially delay the setting of the same beyond the period in which other portions of said cement out of contact with said reagent will set, and also comprising a colloidal vehicle in which the reagent material is incorporated.

10. A composition for treating concrete surfaces to eliminate the surface layer of the concrete, which comprises a colloidal vehicle in which is incorporated a reagent material which will react upon the cement of the concrete to unbalance the composition of the same and render it unsound or non-setting, the said colloidal composition having the property of being insoluble in plain or ordinary water but distensible or soluble in alkaline waters extruded from wet concrete.

11. A composition for treating concrete surfaces to eliminate the surface layer of the concrete as set forth in claim 9, characterized by the fact that the colloidal vehicle comprises a gum.

12. A composition for treating concrete surfaces to eliminate the surface layer of the concrete, as described in claim 10, characterized by the fact that the colloidal vehicle comprises a gum distensible in alkaline waters.

13. A composition for treating concrete surfaces to eliminate the surface layer of the concrete, as set forth in claim 10, characterized by the fact that the colloidal vehicle comprises a resinous substance.

14. A composition for treating concrete surfaces to eliminate the surface layer of the concrete, which comprises a metallic salt capable of unbalancing the composition of Portland cement to render same non-setting, and a colloidal vehicle in which said metallic salt is incorporated.

15. A composition for treating concrete surfaces to eliminate the surface layer of the concrete, which comprises a colloidal vehicle in which is incorporated a metallic salt which will act upon Portland cement to unbalance the composition of the same to render it unsound or non-setting, said colloidal composition having the property of being insoluble in plain or ordinary water but distensible or soluble in alkaline waters extruded from wet concrete.

16. A composition for treating concrete surfaces to eliminate the surface layer of the concrete, which comprises a colloidal vehicle embodying a dissolved gum, in which colloidal vehicle a metallic salt is incorporated which will act upon Portland cement to unbalance the composition of the same to render it unsound or non-setting.

17. A composition for treating concrete surfaces to eliminate the surface layer of the concrete, which comprises a colloidal vehicle in which is incorporated magnesium saccharate.

18. A composition for treating concrete surfaces to eliminate the surface layer of the concrete, which comprises metallic salts which will react upon the cement of the concrete to render the same non-setting, and a colloidal vehicle comprising a gum dissolved in a solvent which enables the aqueous solutions of the metallic salts to be incorporated with the colloidal vehicle without precipitation of the gum.

19. A composition for treating concrete surfaces to eliminate the surface layer of the concrete, which comprises a reagent material which will prevent the setting of Portland cement, and a colloidal vehicle comprising gum dissolved in a solvent which enables the reagent to be incorporated with the colloidal vehicle without precipitation of the gum.

20. A composition for treating concrete surfaces to eliminate the surface layer of the concrete, which comprises a gum material dissolved in alcohol and a metallic salt incorporated therein which will act upon the Portland cement to unbalance the composition of the same to render it unsound or non-setting.

21. A composition for treating concrete surfaces to eliminate the surface layer of the concrete, which comprises a colloidal vehicle in which is incorporated a reagent material, such material being a member of the chemical groups of, and having effective set inhibiting properties substantially equivalent to, either aluminum chloride, magnesium saccharate or magnesium chloride.

22. A composition for treating concrete surfaces to eliminate the surface layer of the concrete, according to claim 21, characterized thereby that the colloidal vehicle comprises dissolved orange shellac gum and manila gum.

23. A composition for treating concrete surfaces to eliminate the surface layer of the concrete, which comprises a reagent material which will prevent the setting of Portland cement, and a colloidal vehicle dissolved in a solvent which enables the reagent material to be incorporated with the colloidal vehicle without precipitation of the colloid.

24. A composition for treating concrete surfaces to eliminate from the concrete body the surface layer, which comprises a colloidal vehicle in which is incorporated a reagent material capable of rendering the surface layer of the concrete readily removable from the concrete body.

25. The method of rendering unsound the surface layer of a concrete body which comprises applying thereto a reagent for inhibiting the setting thereof, the rate of application of said reagent to the concrete surface and the quantity applied per unit of area being definitely controlled within predetermined limits by the use of a suitable adhering vehicle applied to the surface of the forms into which the concrete is poured and forming a thin layer incorporating the reagent whereby a small quantity is gradually made effective.

26. The method of modifying the setting of the surface layer of concrete which comprises applying thereto a predetermined limited quantity of a reagent per unit of area, the application of the reagent being controlled by dialysis of the reagent through an artificial membrane.

27. A composition for treating concrete surfaces to eliminate the surface layer of the cement thereof, which comprises a reagent material which will prevent the setting of the cement with which it comes into contact or substantially delay the setting of the same beyond the period in which other portions of the cement out of contact with said reagent will set, and also comprising a colloidal vehicle in which the reagent material is incorporated, the composition being substantially free of any mineral acid.

28. A composition for treating concrete surfaces to eliminate the surface layer of the cement thereof, which comprises a reagent material which will prevent the setting of the cement with which it comes into contact or substantially delay the setting of the same beyond the period in which other portions of the cement out of contact with said reagent will set, and also comprising a vehicle in which the reagent material is incorporated and being of such body as to form a definite layer when applied to a surface and dried, the composition being substantially free of any mineral acid.

29. The process of treating concrete surfaces which consists in applying to the concrete surface in situ and before it has become hardened, a layer or coating of a composition comprising a reagent material for reacting only upon the cement in the surface layers of the deposited concrete to prevent or substantially retard the setting of such of the cement at said surface as the reagent comes in contact with, said reagent material being applied with a suitable drying vehicle whereby a small quantity is gradually made effective, and removing said treated surface of cement before the same is hardened.

30. Process of treating concrete surfaces which consists in applying to the surface of the form into which the concrete is poured a composition comprising a reagent material reacting only upon the surface layers of cement of the concrete to render the same unsound, the reagent being applied with a suitable drying vehicle whereby the treatment is made gradual and limited.

In testimony whereof I have signed my name to this specification.

NATHAN C. JOHNSON.